US 12,044,276 B2

(12) United States Patent
Sullivan et al.

(10) Patent No.: US 12,044,276 B2
(45) Date of Patent: Jul. 23, 2024

(54) DISPROPORTIONAL DRAG ACTUATION OF AN OVERRUNNING CLUTCH

(71) Applicant: Warner Electric Technology LLC, Braintree, MA (US)

(72) Inventors: Willem Jacobus Sullivan, Rochester Hills, MI (US); David Pearson Stoltze, Brighton, MI (US)

(73) Assignee: Warner Electric Technology LLC, Braintree, MA (US)

( * ) Notice: Subject to any disclaimer, the term of this patent is extended or adjusted under 35 U.S.C. 154(b) by 52 days.

(21) Appl. No.: 17/944,723

(22) Filed: Sep. 14, 2022

(65) Prior Publication Data

US 2024/0084861 A1 Mar. 14, 2024

(51) Int. Cl.
*F16D 41/067* (2006.01)

(52) U.S. Cl.
CPC .................................. *F16D 41/067* (2013.01)

(58) Field of Classification Search
CPC .............................. F16D 41/04; F16D 41/067
See application file for complete search history.

(56) References Cited

U.S. PATENT DOCUMENTS

| 4,132,297 | A | * | 1/1979 | Brown | F16D 41/067 |
| | | | | | 192/36 |
| 4,848,508 | A | * | 7/1989 | Smirl | B60K 17/3465 |
| | | | | | 188/DIG. 1 |
| 4,889,353 | A | * | 12/1989 | Hamada | F16D 41/10 |
| | | | | | 192/48.92 |
| 5,529,158 | A | * | 6/1996 | Itoh | B60K 17/3515 |
| | | | | | 192/45.01 |
| 5,542,514 | A | * | 8/1996 | Itoh | F16D 41/084 |
| | | | | | 192/48.92 |
| 6,446,776 | B1 | | 9/2002 | Kerr | |

(Continued)

FOREIGN PATENT DOCUMENTS

| CN | 201953859 U | 8/2011 |
| JP | 2003-301865 A | 10/2003 |

(Continued)

OTHER PUBLICATIONS

International Search Report issued in corresponding International (PCT) App. No. PCT/US2023/031392 (Dec. 12, 2023).

(Continued)

*Primary Examiner* — Lori Wu
(74) *Attorney, Agent, or Firm* — Reising Ethington P.C.

(57) ABSTRACT

A clutch includes a clutch assembly having radially spaced input and output members, torque transmission members therebetween, and a cage retaining the torque transmission members. Rotation of the input member relative to the output member in a first direction engages the clutch assembly while rotation of the output member relative to the input member in the first direction disengages the clutch assembly. The clutch further includes a drag assembly including a rotatable member coupled to the cage of the clutch assembly and a fixed member. The rotatable member rotates in the first direction relative to the fixed member, but rotation of the rotatable member in a second direction relative to the fixed member is limited thereby limiting rotation of the input member of the clutch assembly in the second direction.

20 Claims, 4 Drawing Sheets

(56) References Cited

U.S. PATENT DOCUMENTS

| | | | |
|---|---|---|---|
| 8,951,025 B2 | 2/2015 | Schultz | |
| 10,107,371 B2 | 10/2018 | Rappenecker et al. | |
| 2004/0099498 A1* | 5/2004 | Kurita | B60N 2/165 |
| | | | 192/48.92 |
| 2007/0251794 A1 | 11/2007 | Shirataki et al. | |
| 2017/0175825 A1* | 6/2017 | Itomi | F16D 41/066 |
| 2017/0211467 A1 | 7/2017 | Hall et al. | |
| 2018/0172088 A1* | 6/2018 | Peglowski | F16D 41/07 |
| 2018/0231071 A1* | 8/2018 | Geiser | F16D 27/00 |

FOREIGN PATENT DOCUMENTS

| | | |
|---|---|---|
| JP | 4007382 B2 | 9/2007 |
| JP | 6848639 B2 | 3/2021 |
| WO | 2011/162200 A1 | 12/2011 |
| WO | 2012/132927 A1 | 10/2012 |
| WO | 2012/152757 A1 | 11/2012 |
| WO | 2016/009264 A1 | 1/2016 |
| WO | 2018/066652 A1 | 4/2018 |

OTHER PUBLICATIONS

Written Opinion issued in corresponding International (PCT) App. No. PCT/US2023/031392 (Dec. 12, 2023).
English (machine) translation of JP 4007382 B2.
English (machine) translation of JP 6848639 B2.
English (machine) translation of WO 2011/162200 A1.
English (machine) translation of WO 2012/132927 A1.
English (machine) translation of WO 2018/066652 A1.

\* cited by examiner

DISPROPORTIONAL DRAG ACTUATION OF AN OVERRUNNING CLUTCH

BACKGROUND OF THE INVENTION a. Field of the Invention

This invention relates to a clutch. In particular, the invention relates to a clutch that allows an input member of the clutch to drive an output member of the clutch in a first direction, the output member to overrun the input member in the first direction and freewheel relative to the input member in a second direction and also prevents rotation of the input member in the second direction.

b. Background Art

Clutches are used in many applications to selectively engage and disengage a driving device such as a motor with a driven device (e.g., one or more wheels) in order to transfer torque from the driving device to the driven device. Conventional clutches exist that enable torque transfer in one rotational direction (uni-directional) or in both rotational directions (bi-directional) and, further, that allow the normally driven member of the clutch attached to the driven device to overrun the driving member of the clutch attached to the driving device. Conventional clutches, however, are not capable of operating in all of the different modes required by certain applications. For example, in one particular application for an electric scooter, a clutch is desired that will allow the driving or input member of the clutch, an electric motor, to drive the driven or output member of the clutch, the wheels, in a first, forward direction, allow the wheels to overrun the motor in the forward direction and freewheel relative to the motor in the second, reverse direction while also preventing reverse rotation of the motor.

The inventors herein have recognized a need for a clutch will minimize and/or eliminate one or more of the above-identified deficiencies.

BRIEF SUMMARY OF THE INVENTION

This invention relates to a clutch. In particular, the invention relates to a clutch that allows an input member of the clutch to drive an output member of the clutch in a first direction, the output member to overrun the input member in the first direction and freewheel relative to the input member in a second direction and also prevents rotation of the input member in the second direction.

A clutch in accordance with one embodiment includes a clutch assembly including an input member disposed about a first rotational axis and coupled to a driving device, an output member disposed about the first rotational axis and coupled to a driven device and a plurality of torque transmission members disposed between the input and output members. Rotation of the input member relative to the output member in a first rotational direction about the first rotational axis causes the plurality of torque transmission members to engage the output member. Rotation of the output member relative to the input member in the first rotational direction about the first rotational axis causes the plurality of torque transmission members to disengage from the output member. The clutch assembly further includes a cage configured to retain the plurality of torque transmission members and configured for rotation with the input member. The clutch further includes a drag assembly including a rotatable member disposed about a second rotational axis and coupled to the cage of the clutch assembly for rotation therewith. The drag assembly further includes a fixed member fixed against rotation about the second rotational axis. The rotatable member rotates in the first rotational direction about the second axis relative to the fixed member, but rotation of the rotatable member in a second rotational direction, opposite the first rotational direction, about the second axis relative to the fixed member is limited thereby limiting rotation of the input member of the clutch assembly in the second rotational direction about the first axis.

A clutch in accordance with another embodiment includes a clutch assembly including a first member disposed about a first rotational axis, a second member disposed about the first rotational axis and radially spaced from the first member and a plurality of torque transmission members disposed between the first and second members. Rotation of the first member relative to the second member in a first rotational direction about the first rotational axis causes the plurality of torque transmission members to engage the second member. Rotation of the second member relative to the first member in the first rotational direction about the first rotational axis causes the plurality of torque transmission members to disengage from the second member. The clutch assembly further includes a cage configured to retain the plurality of torque transmission members and configured for rotation with the first member. The clutch further includes a drag assembly including a rotatable member disposed about a second rotational axis and coupled to the cage of the clutch assembly for rotation therewith. The drag assembly further includes a fixed member fixed against rotation about the second rotational axis. The rotatable member rotates in the first rotational direction about the second axis relative to the fixed member, but rotation of the rotatable member in a second rotational direction, opposite the first rotational direction, about the second axis relative to the fixed member is limited thereby limiting rotation of the input member of the clutch assembly in the second rotational direction about the first axis.

A clutch in accordance with the present teachings represents an improvement as compared to conventional clutches. In particular, the clutch enables a combination of operating modes in which the driving or input member of the clutch is able to drive the driven or output member of the clutch in a first direction, the driven or output member can overrun the driving or input member in the first direction and freewheel relative to the driving or input member in the second direction and rotation of the driving or input member in the second direction is prevented.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
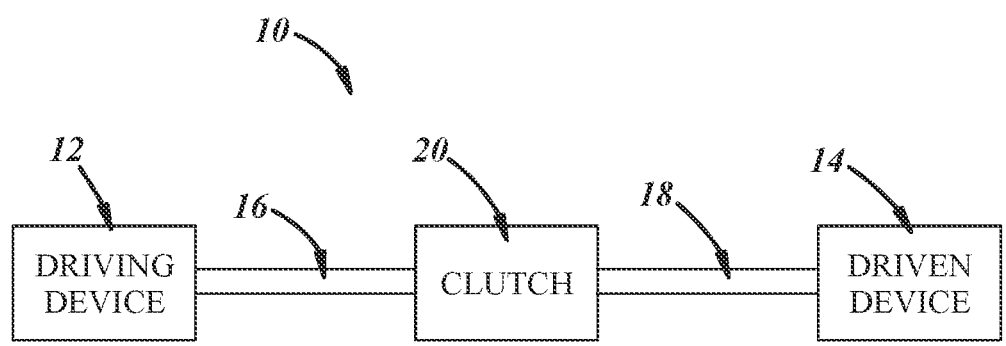
FIG. 1 is diagrammatic view of a system incorporating a clutch in accordance with the present teachings.

Referring now to the drawings wherein like reference numerals are used to identify identical components in the various views, FIG. 1 illustrates a power generation and transmission system 10. System 10 includes a driving device 12 for generating power used to drive a driven device 14. The driving device 12 may comprise a conventional motor including, for example, an electric motor, hydraulic motor or pneumatic motor. Device 12 may further include a conventional gear box or speed reducer (which may be combined with the motor to form a conventional gear motor) to control the output speed and torque delivered to driven device 14. Device 12 may output rotational torque through an output member 16 such as a shaft or another rotating body such as a gear, pulley or sprocket. Driven device 14 may comprise, for example, one or more wheels for a transport vehicle such as a scooter or cycle. It should be understood, that the form of device 14 will depend on the application and that device 14 may comprise any of a wide variety of devices configured to receive an input torque. Device 14 may input rotational torque through an input member 18 such as a shaft or another rotating body such as a gear, pulley or sprocket. Although devices 12, 14 are labeled herein as "driving" and "driven" devices in accordance with their primary mode of operation, it should be understood that the direction of torque transfer through system 10 could be reversed under certain operating conditions such that driven device 14 generates and outputs torque through member 18 and driving device 12 inputs torque through member 16. System 10 may further include a clutch 20 in accordance with the teachings disclosed herein. Clutch 20 selectively couples devices 12, 14 to transfer torque between devices 12, 14. In particular, clutch 20 receives torque from output member 16 of device 12 and selectively transfers torque to input member 18 of device 14. As noted above, clutch 20 may similarly receive torque from input member 18 of device 14 and selectively transfer torque to output member 16 of device 12 in certain conditions. It should be understood that output member 16 may be formed in device 12 or clutch 20 and, similarly, that input member 18 may be formed in device 14 or clutch 20.

Figure 4:
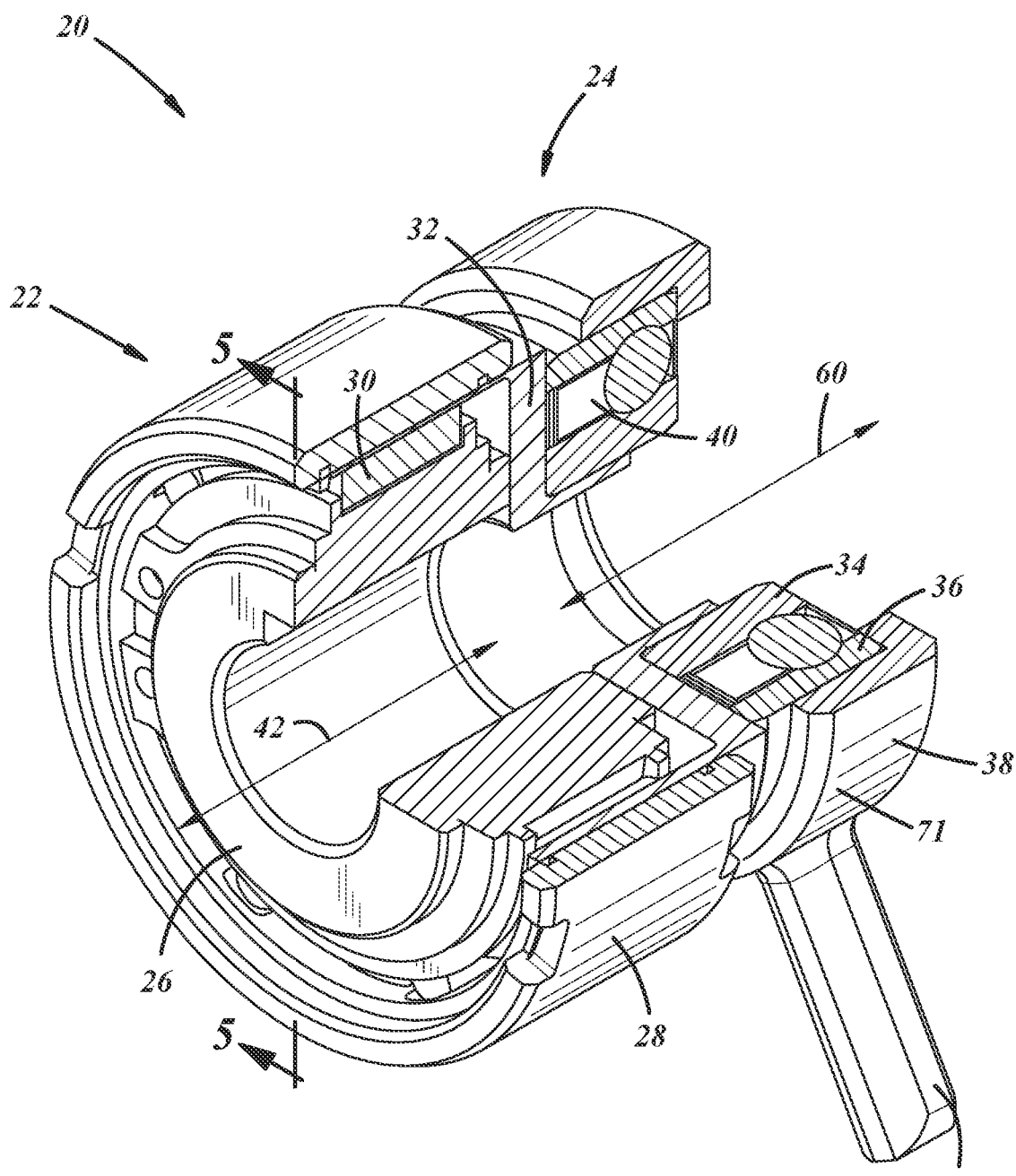
FIG. 4 is a perspective view of the clutch of FIGS. 2-3 with a portion of the clutch removed.
Figure 5:
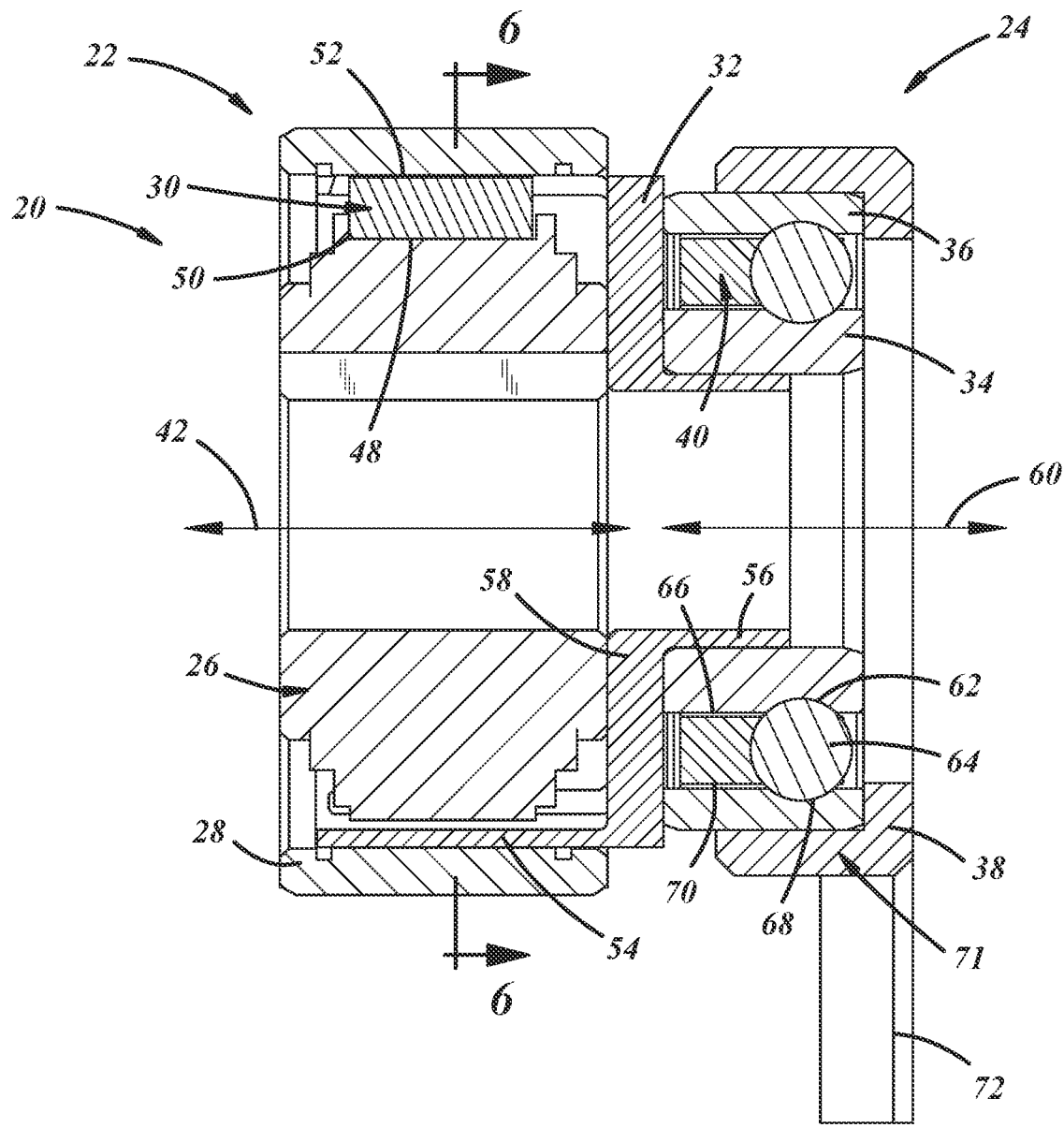
FIG. 5 is a cross-sectional view of the clutch of FIGS. 2-4 taken along lines 5-5 in FIG. 2.

Referring now to FIGS. 2-5, clutch 20 includes a clutch assembly 22 and a drag assembly 24. Clutch assembly 22 is provided to selectively transmit torque between driving and driven devices 12, 14. Referring to FIGS. 4-5, clutch assembly 22 includes an input member, 26, an output member 28, a plurality of torque transmission members 30 and a cage 32. Drag assembly 24 provides varying levels of drag to cage 32 of clutch assembly 22 in order to brake elements of clutch assembly 22 and implement certain operating modes of clutch 20. In the illustrated embodiment, assembly 24 includes a rotatable member 34, a fixed member 36, means, such as grounding frame 38, for inhibiting rotation of fixed member 36, and means, such as torque transmission members 40, for transmitting a braking torque from fixed member 36 to rotatable member 34.

Figure 6:
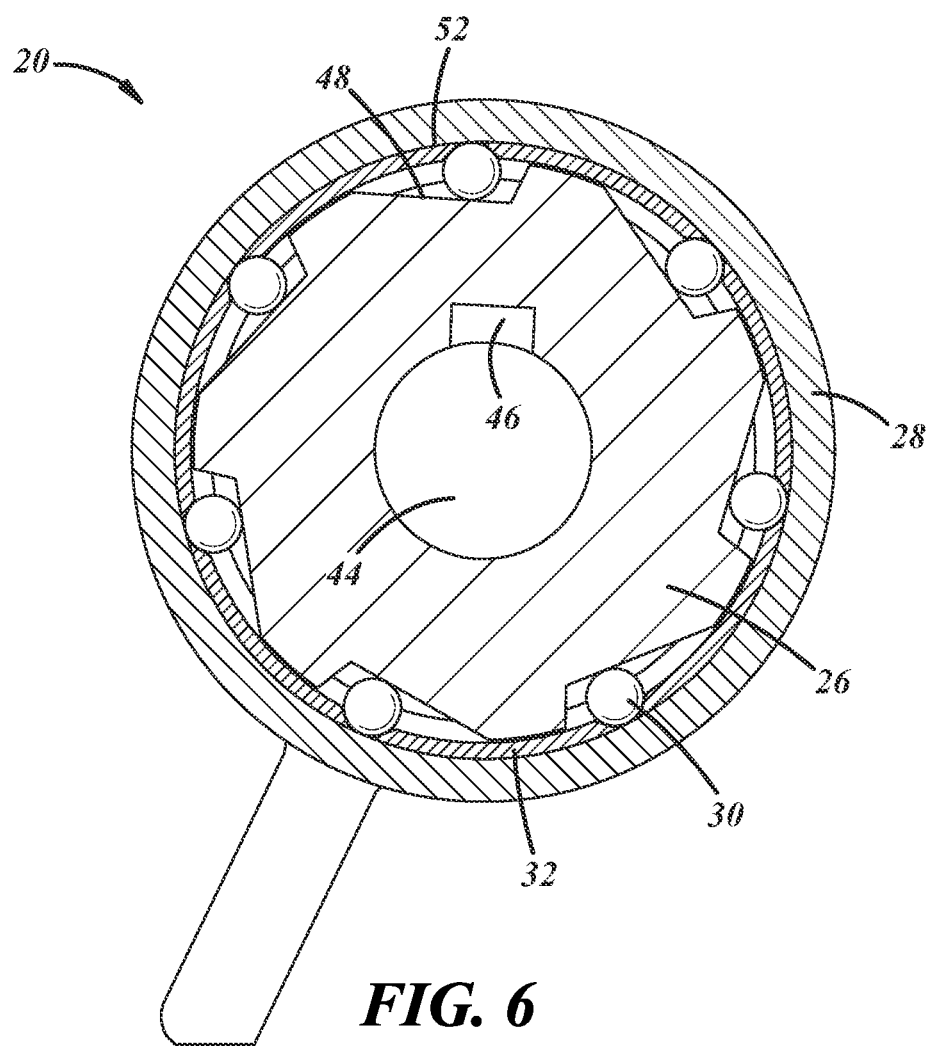
FIG. 6 is a cross-sectional view of the clutch of FIGS. 2-5 taken along lines 6-6 in FIG. 5.
Figure 2:
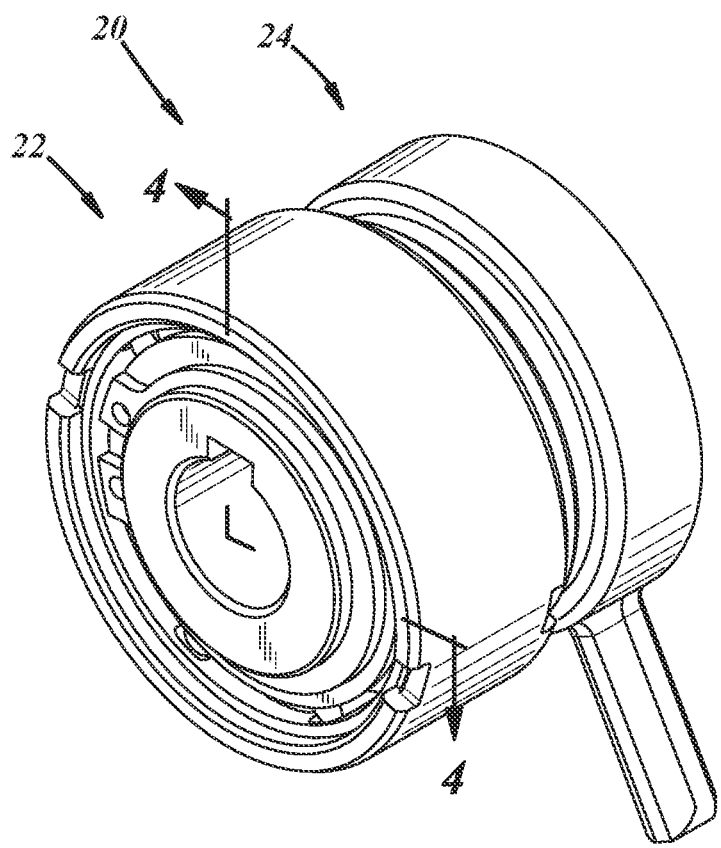
FIGS. 2-3 are perspective views of a clutch in accordance with one embodiment of the present teachings.
Figure 3:
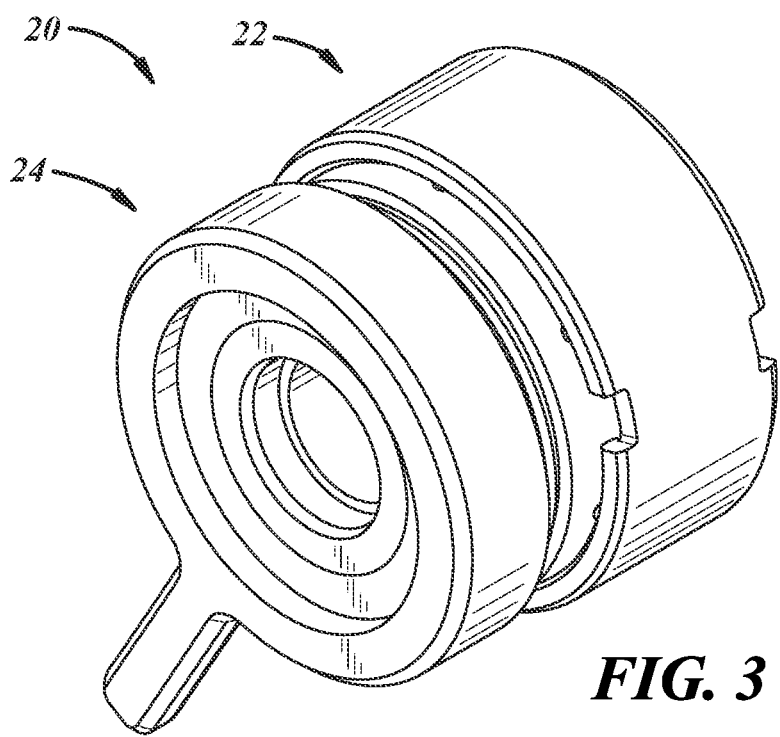

Input member 26 receives torque from device 12 through member 16 and selectively transfers torque to output member 28 through torque transmission members 30. Member 26 is disposed about and may be centered about a rotational axis 42. In the illustrated embodiment, input member 26 is disposed radially inwardly of output member 28. It should be understood, however, that the relative positions of input member 26 and output member 28 could be reversed such that input member 26 is disposed radially outwardly of output member 28. Referring to FIG. 6, input member 26 is annular in shape and may define a circular bore 44 configured to receive member 16. A radially inner surface of member 26 may further define a keyway 46 in communication with bore 44 and configured to receive a key used to couple input member 26 to member 16 for rotation therewith about axis 42. It should be understood, however, that member 26 may be coupled to member 16 in a variety of ways. Input member 26 defines a plurality of ramps 48 or cam surfaces on a radially outer surface. Each torque transmission member 30 moves along a corresponding ramp 48 on input member 26 between an engagement position proximate one end of the ramp 48 in which the members 30 are wedged between members 26, 28 of clutch assembly 22 and engage each member 26, 28 and a disengagement position proximate the other end of the ramp 48 in which the members 30 are disengaged from output member 28. Referring to FIG. 5, the diameter of member 26 may vary along the axial length of member 26 and may define shoulders 50 on either axial end of each ramp 48 configured to limit movement of members 30 along axis 42 relative to member 26.

Output member 28 transfers torque received from input member 26 through torque transmission members 30 to device 14 through member 18. Output member 28 may be coupled to member 18 in a variety of ways known in the art depending on the construction of member 18. Output member 28 is disposed about and may be centered about axis 42. Again, in the illustrated embodiment, output member 28 is disposed radially outwardly of input member 26. It should be understood, however, that the relative positions of input member 26 and output member 28 could be reversed such that output member 28 is disposed radially inwardly of input member 26. Output member 28 is annular in shape and may define a circular bore configured to receive input member 26, torque transmission members 30 and cage 32. A radially inner surface 52 of member 28 opposes ramps 48 on input member 26 and defines an engagement surface for torque transmission members 30 during engagement of clutch assembly 22.

Torque transmission members 30 transfer torque from input member 26 to output member 28. In the illustrated embodiment, members 30 comprise rollers. It should be understood, however, that members 30 may assume any of a variety of forms conventional in the art including, for example, pawls or sprags. Members 30 are supported by cage 32 and may be equally spaced circumferentially about axis 42 between members 26, 28. In the illustrated embodiment, each member 30 moves along a corresponding ramp 48 on input member 26 between an engagement position proximate one end of the ramp 48 in which the members 30 are wedged between and engage ramp 48 of member 26 and surface 52 of member 28 and a disengagement position proximate the other end of the ramp 48 in which the members 30 are disengaged from surface 52 of output member 28.

Cage 32 is provided to maintain the relative circumferential position and spacing of torque transmission members 30. In accordance with one aspect of the clutch disclosed herein, cage 32 is also provided to shift members 30 between the engagement and disengagement positions under certain operating conditions for clutch 20 to allow output member 28 to freewheel relative to input member 26. Referring to FIG. 5, cage 32 is generally Z-shaped in cross-section. In particular, cage 32 includes a pair of generally axially extending portions 54, 56 and a generally radially extending portion 58 extending between portions 54, 56. Portion 54 extends between input and output members 26, 28 of clutch assembly 22 and is configured to position and space torque transmission members 30. Referring to FIG. 6, portion 54 engages a pair of spaced circumferential sections of each roller 30. Due to the configuration of input member 26, torque transmission members 30, and cage 32, cage 32 is configured for rotation with input member 30 about axis 42, but can shift relative to input member 26 in a circumferential direction about axis 42 to move torque transmission members 30 between engaged and disengaged positions within clutch assembly 22. Referring again to FIG. 5, portion 56 of cage 32 extends at least part way through drag assembly 24. In the illustrated embodiment, portion 56 is disposed radially inwardly of rotatable member 34. In accordance with one aspect of the clutch 20 disclosed herein, cage 32 is coupled to rotatable member 34 such that input member 26 of clutch assembly 22 and rotatable member 34 of drag assembly 24 are configured for rotation with one another. Cage 32 may be coupled to rotatable member 34 in a variety of ways conventional in the art including through fasteners such as welds or adhesives or through complementary shapes including crimps, splines, keys and keyways or interlocking lugs. Portion 58 of cage 32 extends between and connects portions 54, 56. Portions 56, 58 together define a shoulder configured to receive and support drag assembly 24.

Rotatable member 34 of drag assembly 24 is provided to transfer a braking torque to input member 26 of clutch assembly 22, through cage 32 and torque transmission members 30, to prevent rotation of input member 26 in one rotational direction about axis 42. Rotatable member 34 is disposed about and may be centered about a rotational axis 60. In the illustrated embodiment, axis 60 is coincident with axis 42. Rotatable member 34 is annular in shape. An inner diameter of member 34 may be sized to receive portion 56 of cage 32 and member 34 may be supported on portion 56 of cage 32. A radially outer surface of member 34 may define an inner race 62 for bearings 64 disposed between rotatable member 34 and fixed member 36. Another portion of the radially outer surface of member 34, axially spaced from race 62, may define an engagement surface 66 for torque transmission members 40 during engagement of drag assembly 24. In the illustrated embodiment, surface 66 is disposed nearer to clutch assembly 24 than race 62, but it should be understood that the relative positions of race 62 and surface 66 (and therefore bearings 64 and members 40 may be reversed.

Fixed member 36 transmits a braking torque to rotatable member 34 (and ultimately to input member 26 of clutch assembly 22) to limit or inhibit rotation of rotatable member 34 (and input member 26 of clutch assembly 22) in one rotational direction about axis 60. Fixed member 36 may be disposed about, and may be centered about axis 60. Fixed member 36 is fixed against rotation about axis 60 by grounding frame 38. Member 36 is annular in construction. A radially inner surface of member 36 may define an outer race 68 for bearings 64. Another portion of the radially outer surface, axially spaced from race 68, may define an engagement surface 70 for torque transmission members 40 during engagement of drag assembly 24. Again, in the illustrated embodiment, surface 70 is disposed nearer to clutch assembly 24 than race 68, but it should be understood that the relative positions of race 68 and surface 70 (and therefore bearings 64 and members 40 may be reversed. An outer diameter of member 36 is sized to be received within grounding frame 38.

Grounding frame 38 provides a means for inhibiting rotation of fixed member 36. Referring to FIG. 4, grounding frame 38 includes a substantially circular body 71 and an arm 72 projecting radially outwardly from body 71. Arm 72 is configured for attachment to a rotationally fixed structure. Body 71 is configured for coupling to fixed member 36 of drag assembly 24. Referring again to FIG. 5, body 71 may be configured to surround fixed member 36 and has an inner diameter sized to received fixed member 36 and engage fixed member 36 in an interference fit. The inner diameter of body 71 may vary to define a shoulder proximate one axial end of body 71 configured to engage fixed member 36 of drag assembly 24 and opposing the shoulder formed in cage 32 and engaging rotatable member 34 of drag assembly 24. It should be understood that the application of mechanical force to fix member 36 against rotation and the configuration of grounding frame 38 are exemplary only. Member 36 could be fixed against rotation in a variety of ways. For example, as opposed to mechanical force, electromagnetic force could be used to maintain the position of fixed member 36. As opposed to the particular structure of grounding frame 38, a variety of different structures could be formed to couple member 36 to a fixed structure and otherwise inhibit rotation of fixed member 36.

Torque transmission members 40 transfer a braking torque from fixed member 36 to rotatable member 34. Members 40 may comprise sprags. It should be understood, however, that members 40 may assume any of a variety of forms conventional in the art including, for example, pawls. Members 40 may be supported by a cage (not shown) and biased to a predetermined position by springs (not shown) in a conventional manner. Members 40 may be equally spaced circumferentially about axis 60 between members 34, 36. When rotatable member 34 rotates in one rotational direction about axis 60 members 40 assume a disengaged position in which members 40 are disengaged from one or both of surfaces 66, 70 in rotatable member 34 and fixed member 36 and torque is not transmitted between rotatable member 34 and fixed member 36. When rotatable member 34 rotates in the opposite rotational direction about axis 60, members 40 move (e.g., as a result of centrifugal force) from the disengaged position to an engaged position in which members 40 are wedged between and engage surfaces 66, 70 in rotatable member 34 and fixed member 36 such that a braking torque is transferred from fixed member 36 to rotatable member 34.

Although a particular embodiment of drag assembly 24 in the form of a friction clutch has been described above, it should be understood that drag assembly 24 could be formed in a variety of different ways that permit rotation of a rotatable member such as member 34 in one rotational direction (clockwise in the illustrated embodiment) about axis 60 relative to fixed member 36 and limit rotation of rotatable member 34 in the opposite rotational direction (counterclockwise in the illustrated embodiment) about axis 60 relative to fixed member 36. Drag assembly 42 could be formed, for example, as a different type of clutch by varying the type of torque transmission members between rotatable member 34 and fixed member 36. Alternatively, drag assembly 24 could be formed as a brake system (e.g., with rotatable (rotor) and fixed (stator) discs that are selectively engaged through mechanical, fluid (pneumatic or hydraulic) or electromagnetic forces).

Clutch 20 has several different modes of operation. In one mode of operation, clutch 20 is configured to transmit a torque from input member 26 of clutch assembly 22 to output member 28 of clutch assembly 22 to cause rotation of output member 28 in a first rotational direction. Referring to FIG. 6, in the illustrated embodiment, rotation of input member 26 in a clockwise direction relative to output member 28 causes torque transmission members 30 to move along ramps 48 from a disengaged position to an engaged position in which members 30 are wedged between input member 26 and output member 28 and engage corresponding surfaces (ramp 48 and surface 72) of input member 26 and output member 28. Referring again to FIG. 5, in this manner torque is transferred from input member 26 to output member 28 causing output member 28 to also rotate in the clockwise direction about axis 42. Cage 32 rotates with input member 26 in the clockwise direction causing corresponding rotation of rotatable member 48 about axis 60 in the clockwise direction. Drag assembly 24 is configured to permit rotation of rotatable member 34 in the clockwise direction. Therefore, torque transmission members 40 assume a disengaged position in which members 40 do not engage at least one of rotatable member 34 and fixed member 36 and rotatable member 34 is able to rotate relative to fixed member 36. The mass of rotatable member 34 applies a relatively low amount of drag to cage 32.

In another mode of operation, clutch 20 is configured to operate as an overrunning clutch in one rotational direction. As discussed above, when input member 26 of clutch assembly 22 rotates relative to output member 28 of clutch assembly 22 in a clockwise direction, clutch assembly 22 engages and drives output member 28 in the same direction and at the same speed as input member 26. If, however, a larger torque is applied to output member 28 such that output member rotates relative to input member 26 in the clockwise direction about axis 42 at a greater speed, torque transmission members 30 will move along ramps 48 on input member 26 from an engaged position to a disengaged position in which members 30 are no longer wedged between input member 26 and output member 28 and engaging surface 52 of output member 28. Output member 28 is therefore capable of overrunning input member 26 when output member 28 rotates in the clockwise direction at a greater speed than input member 26.

In another mode of operation, clutch 20 is configured to disengage clutch assembly 22 when input member 26 of clutch assembly 22 is driven in the clockwise direction by driving device 12, but output member is being driven in a counterclockwise direction by driven device 14 with a larger torque thereby allowing output member 28 to freewheel relative to input member 26 in the counterclockwise direction. The relative rotation of input and output members 26, 28 with input member 26 rotating in a clockwise direction and output member 28 rotating in a counterclockwise direction initially results in engagement of clutch assembly 22 as described hereinabove. However, when a larger torque is being applied to output member 28 than to input member 26, the torque applied to input member 26 in the clockwise direction will be overcome and torque transmission members 30, cage 32 and input member 26 will be driven in a counterclockwise direction about axis 42. Rotation of cage 32 in the counterclockwise direction causes limited rotation of rotatable member 34 of drag assembly 24 in a counterclockwise direction about axis 60. Rotation of rotatable member 34 in the counterclockwise direction relative to fixed member 36 of drag assembly 24 causes torque transmission members 40 of drag assembly 24 to move from a disengaged position to an engaged position in which members 40 become wedged between surfaces 66, 70 rotatable member 34 and fixed member 36. Because fixed member 36 is fixed against rotation through grounding frame 38, a braking torque is applied to rotatable member 34 through torque transmission members 40 and further rotation of rotatable member 34 is inhibited. Because cage 32 is coupled to rotatable member 34 further rotation of cage 32 about axis 42 is also inhibited. Cage 32 applies a force to torque transmission members 30 in clutch assembly 22 causing members 30 to move along ramps 48 from the engaged position between input and output members 26, 28 to a disengaged position. Following disengagement of clutch assembly 22, output member 28 may rotate or freewheel about input member 26 in the counterclockwise direction about axis 42. Continued application of torque to input member 26 in a clockwise direction will cause rotation of input member 26 in the clockwise direction to resume along with corresponding rotation of torque transmission members 30, cage 32 and rotatable member 34 of drag assembly 24 thereby disengaging drag assembly 24.

In another modes of operation, clutch 20 is configured to operate as a brake and a freewheel clutch when input member 26 is driven in the opposite rotational direction (counterclockwise in the illustrated embodiment). Referring again to FIG. 6, when input member 26 is driven by driving device 12 in a counterclockwise direction about axis 42, torque transmission members 30 either move, if clutch assembly 24 is engaged, along ramps 48 from an engaged position in which members 30 are wedged between ramp 48 of input member 26 and surface 52 of output member 28 to a disengaged position in which members 30 do not engage surface 52 of output member 28 or remain in a disengaged position if clutch assembly 22 is already disengaged. Referring to FIG. 5, once members 30 are in a disengaged position, cage 32 and rotatable member 34 of drag assembly 24 are driven in a counterclockwise direction by the rotation of input member 26 of clutch assembly 22. Rotation of rotatable member 34 in the counterclockwise direction relative to fixed member 36 of drag assembly 24 causes torque transmission members 40 of drag assembly 24 to move from a disengaged position to an engaged position in which members 40 become wedged between rotatable member 34 and fixed member 36 and engage corresponding surfaces 66, 70 in rotatable member 34 and fixed member 36. Because fixed member 36 is fixed against rotation through its attachment to grounding frame 38, a braking torque is applied to rotatable member 34 and further rotation of rotatable member 34 is inhibited. Because cage 32 is coupled to rotatable member 34, rotatable member 34 applies a relatively heavy amount of drag to cage 32 inhibiting further rotation of cage 32 and torque transmission members 30 of clutch assembly 22 about axis 42 and, therefore, further rotation of input member 26 in a counterclockwise direction about axis 42. As a result, clutch 20 brakes rotation of input member 26 in a counterclockwise direction and, depending on the coupling between driving device 12 and input member 26, may also brake rotation of driving device 12. Because clutch assembly 22 is disengaged, output member 28 may rotate (freewheel) in either rotational direction relative to input member 26. Input member 26, cage 32 and rotatable member 30 will remain stationary unless and until the torque driving input member 26 in a counterclockwise direction exceeds the friction force maintaining the connections between (i) rotatable member 34 and torque transmission members 40 of drag assembly 24, (ii) torque transmission members 40 and fixed member 36 or (iii) fixed member 36 and grounding frame 38. One or more elements of drag assembly 24 can therefore be configured to establish a predetermined amount of torque that, when applied to input member 26 of clutch assembly 22, will allow input member 26 to rotate in the counterclockwise direction. For example, the interference fit between fixed member 36 and grounding frame 38 can be configured to establish this predetermined amount of torque thereby allowing the fixed member 36 and other elements of drag assembly 24 to rotate when the predetermined torque is applied and avoiding potential damage to drag assembly 24.

A clutch 20 in accordance with the present teachings represents an improvement as compared to conventional clutches. In particular, the clutch 20 enables a combination of operating modes in which the driving or input member 26 of the clutch 20 is able to drive the driven or output member 28 of the clutch 20 in a first direction, the driven or output member 28 can overrun the driving or input member 26 in the first direction and freewheel relative to the driving or input member 26 in the second direction and rotation of the driving or input member 26 in the second direction is prevented.

While the invention has been shown and described with reference to one or more particular embodiments thereof, it will be understood by those of skill in the art that various changes and modifications can be made without departing from the spirit and scope of the invention.

What is claimed is:

1. A clutch, comprising:
    a clutch assembly including
        an input member disposed about a first rotational axis and coupled to a driving device;
        an output member disposed about the first rotational axis and coupled to a driven device;
        a plurality of torque transmission members disposed between the input and output members, rotation of the input member relative to the output member in a first rotational direction about the first rotational axis causing the plurality of torque transmission members to engage the output member and rotation of the output member relative to the input member in the first rotational direction about the first rotational axis causing the plurality of torque transmission members to disengage from the output member; and,
        a cage configured to retain the plurality of torque transmission members and configured for rotation with the input member; and,
    a drag assembly including
        a rotatable member disposed about a second rotational axis and coupled to the cage of the clutch assembly for rotation therewith; and,
        a fixed member fixed against rotation about the second rotational axis
        wherein the rotatable member rotates in the first rotational direction about the second axis relative to the fixed member, but rotation of the rotatable member in a second rotational direction, opposite the first rotational direction, about the second axis relative to the fixed member is limited thereby limiting rotation of the input member of the clutch assembly in the second rotational direction about the first axis.

2. The clutch of claim 1 wherein the second rotational axis is coincident with the first rotational axis.

3. The clutch of claim 1 wherein the input member is disposed radially inward of the output member.

4. The clutch of claim 1 wherein the input member is disposed radially outward of the output member.

5. The clutch of claim 1 wherein the plurality of torque transmission members of the clutch assembly comprise rollers and the input member defines a plurality of ramps facing the output member and along which the rollers travel.

6. The clutch of claim 1 wherein the cage includes a first axially extending portion extending between the input and output members of the clutch assembly, a second axially extending portion coupled to the rotatable member of the drag assembly and a radially extending portion extending between the first and second axially extending portions.

7. The clutch of claim 1 wherein the cage engages a first radial surface of the rotatable member opposite a second radial surface of the rotatable member facing the fixed member.

8. The clutch of claim 1, further comprising a grounding frame engaging the fixed member in an interference fit.

9. The clutch of claim 1, wherein the drag assembly further includes a plurality of torque transmission members disposed between the rotatable and fixed members, rotation of the rotatable member relative to the fixed member in the first rotational direction about the second rotational axis causing the plurality of torque transmission members of the drag assembly to disengage from at least one of the rotatable and fixed members and rotation of the rotatable member relative to the fixed member in the second rotational direction about the second rotational axis causing the plurality of torque transmission members of the drag assembly to engage with both of the rotatable and fixed members.

10. The clutch of claim 1 wherein rotation of the output member relative to the input member in the second rotational direction about the first rotational axis with a first torque during rotation of the input member relative to the output member in the first rotational direction with a second torque less than the first torque results in disengagement of the output member with the plurality of torque transmission members permitting rotation of the input member in the first rotational direction about the first rotational axis and rotation of the output member in the second rotational direction about the first rotational axis.

11. A clutch, comprising:
    a clutch assembly including
        a first member disposed about a first rotational axis;
        a second member disposed about the first rotational axis and radially spaced from the first member;
        a plurality of torque transmission members disposed between the first and second members, rotation of the first member relative to the second member in a first rotational direction about the first rotational axis causing the plurality of torque transmission members to engage the second member and rotation of the second member relative to the first member in the first rotational direction about the first rotational axis causing the plurality of torque transmission members to disengage from the second member; and,
        a cage configured to retain the plurality of torque transmission members and configured for rotation with the first member; and,
    a drag assembly including
        a rotatable member disposed about a second rotational axis and coupled to the cage of the clutch assembly for rotation therewith; and,
        a fixed member fixed against rotation about the second rotational axis
        wherein the rotatable member rotates in the first rotational direction about the second axis relative to the fixed member, but rotation of the rotatable member in a second rotational direction, opposite the first rotational direction, about the second axis relative to the fixed member is limited thereby limiting rotation of the first member of the clutch assembly in the second rotational direction about the first axis.

12. The clutch of claim 11 wherein the second rotational axis is coincident with the first rotational axis.

13. The clutch of claim 11 wherein the first member is disposed radially inward of the second member.

14. The clutch of claim 11 wherein the first member is disposed radially outward of the second member.

15. The clutch of claim 11 wherein the plurality of torque transmission members of the first clutch assembly comprise rollers and the first member defines a plurality of ramps facing the second member and along which the rollers travel.

16. The clutch of claim 11 wherein the cage includes a first axially extending portion extending between the first and second members of the clutch assembly, a second axially extending portion coupled to the rotatable member of the drag assembly and a radially extending portion extending between the first and second axially extending portions.

17. The clutch of claim 11 wherein the cage engages a first radial surface of the rotatable member opposite a second radial surface of the rotatable member facing the fixed member.

18. The clutch of claim 11, further comprising a grounding frame engaging the fixed member in an interference fit.

19. The clutch of claim 11, wherein the drag assembly further includes a plurality of torque transmission members disposed between the rotatable and fixed members, rotation of the rotatable member relative to the fixed member in the first rotational direction about the second rotational axis causing the plurality of torque transmission members of the drag assembly to disengage from at least one of the rotatable and fixed members and rotation of the rotatable member relative to the fixed member in the second rotational direction about the second rotational axis causing the plurality of torque transmission members of the drag assembly to engage with both of the rotatable and fixed members.

20. The clutch of claim 11 wherein rotation of the second member relative to the first member in the second rotational direction about the first rotational axis with a first torque during rotation of the first member relative to the second member in the first rotational direction with a second torque less than the first torque results in disengagement of the second member with the plurality of torque transmission members permitting rotation of the first member in the first rotational direction about the first rotational axis and rotation of the second member in the second rotational direction about the first rotational axis.

* * * * *